(12) United States Patent
Sherlock

(10) Patent No.: US 7,039,017 B2
(45) Date of Patent: May 2, 2006

(54) SYSTEM AND METHOD FOR DETECTING AND LOCATING INTERFERERS IN A WIRELESS COMMUNICATION SYSTEM

(75) Inventor: Ian J. Sherlock, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 938 days.

(21) Appl. No.: 10/033,006

(22) Filed: Dec. 28, 2001

(65) Prior Publication Data

US 2003/0123420 A1 Jul. 3, 2003

(51) Int. Cl.
*H04J 1/16* (2006.01)
*H04Q 7/24* (2006.01)

(52) U.S. Cl. .................... 370/252; 370/338
(58) Field of Classification Search ............... 370/252, 370/338, 328; 455/423, 424, 67.11, 67.13
See application file for complete search history.

(56) References Cited

U.S. PATENT DOCUMENTS

| | | | |
|---|---|---|---|
| 5,572,528 A | 11/1996 | Shuen ................ 370/85.13 |
| 5,603,093 A * | 2/1997 | Yoshimi et al. ........... 455/63.1 |
| 5,845,209 A * | 12/1998 | Iwata ................ 455/423 |
| 5,896,561 A * | 4/1999 | Schrader et al. ......... 455/67.11 |
| 5,926,761 A * | 7/1999 | Reed et al. ............. 455/440 |
| 5,982,807 A | 11/1999 | Snell ................ 375/200 |
| 5,987,033 A | 11/1999 | Boer et al. ........... 370/445 |
| 6,775,544 B1 * | 8/2004 | Ficarra ............... 455/424 |
| 6,842,460 B1 * | 1/2005 | Olkkonen et al. ....... 370/465 |

* cited by examiner

*Primary Examiner*—Chau Nguyen
*Assistant Examiner*—Michael Chuen
(74) *Attorney, Agent, or Firm*—Abdul Zindani; W. James Brady, III; Frederick J. Telecky, Jr.

(57) ABSTRACT

A system and method is provided for monitoring interference in a wireless communication system. The system and method monitor error statistic data at one or more devices in a wireless communication system. The error statistic data can be utilized to determine the location of the interference. If any unusual error statistic data is present at the one or more of the devices, raw unprocessed data is provided from the devices experiencing unusual error activity. The raw unprocessed data can be utilized to characterize the interference. For example, the raw unprocessed data can be compared to one or more interference templates to determine an interference type. The raw unprocessed data can be compared between devices in the wireless communication system to determine the location of the interference with increased precision.

35 Claims, 7 Drawing Sheets

SYSTEM AND METHOD FOR DETECTING AND LOCATING INTERFERERS IN A WIRELESS COMMUNICATION SYSTEM

TECHNICAL FIELD

The present invention relates to communications and in particular to systems and methods for detecting and locating interferers in a wireless communication system.

BACKGROUND OF INVENTION

The use of communication systems having mobile devices or mobile station systems which communicate with a hard-wired network, such as a local area network (LAN) or a wide area network (WAN), has become widespread. For example, retail stores and warehouse use communication systems with mobile data terminals to track inventory and replenish stock. Manufacturing facilities employ these for tracking parts, completed products and defects. Such systems are also utilized for cellular telephone communications to allow users with wireless telephones to roam across large geographical regions while retaining telephonic access. Paging networks utilize cellular communications systems to enable a user carrying a pocket sized pager to be paged anywhere within a geographic region. A typical wireless communication system includes a number of fixed access points interconnected by a cable medium often referred to as a system backbone or distribution system. An access point is a device that typically forms a bridge between a wired network and one or more mobile station systems.

Recently a standard for wireless local area networks (WLANs) known as the IEEE 802.11 standard has been adopted. The IEEE 802.11 standard for WLANs is a standard for systems that operate in the 2,400–2,483.5 MHz industrial, scientific and medical (ISM) band. The ISM band is available worldwide and allows unlicensed operation of spread spectrum systems. The IEEE 802.11 RF transmissions use multiple signaling schemes (modulations) at different data rates to deliver a single data packet between wireless systems. The latest IEEE 802.11 wireless LAN uses a band of frequencies near 2.4 Ghz for direct sequence spread spectrum transmissions. Another recently adopted short-range standard has evolved known as the Bluetooth standard. The Bluetooth standard is a low-cost short range wireless connection which uses much of the same range of frequencies for its frequency-hopping spread spectrum transmissions as the IEEE 802.11 standard. Consequently, there is expected to be considerable interference between the two systems.

Recently, a revised standard of the IEEE 802.11 has evolved referred to as the IEEE 802.1b standard. The IEEE 802.11b standard has a high rate DSSS Physical layer that uses a portion of radio frequency spectrum in the 2.4 GHz band. In the United States this spectrum has been allocated by the FCC to Industrial Scientific and Medical applications. The wireless medium is shared between the mobile stations in a manner defined by the IEEE 802.11b standard. Many devices other than IEEE 802.11b wireless LANs can operate in the 2.4 GHz ISM frequency band. Examples of such systems include microwave ovens, cordless telephones, Bluetooth personal area networks, short range consumer video transmitters, wireless LAN products designed for FHSS, or non 802.11 physical layer operation, wireless telemetry and control systems and malfunctioning or unauthorized 802.11 systems.

When such devices are introduced into a physical area served by an IEEE 802.11b 2.4 GHz DSSS wireless LAN, performance of the LAN will be degraded or totally disrupted. When such a disruption takes place it may be very difficult to locate the source of the interference, given the transient nature of the interference, and the physical area in which the source may be located. Digital communication over a wireless medium is intrinsically error prone so protocols such as 802.11 protocol include many built in mechanisms for working in the presence of interferes. These include automatic frame retransmission, automatic rate reduction, frame fragmentation schemes and physical layer spread spectrum modulation. Detecting interferers is conventionally performed by means of test equipment such as a spectrum analyzer which may be a portable handheld device with a directional antenna to aid in location of the interference.

The problem of detecting and removing wireless network interferers is analogous to that of network debug in the early days of shared wired Ethernet, where a faulty node could prevent operation of systems on the entire wired segment. Debugging such problems often required that a technician visit, and temporarily isolate, each node. This was a disruptive and time-consuming task. In a wireless environment, the difficulty of the debug task is greater, since the cause of the problem may not be located near any of the wireless nodes, and possibly not even within the premises of the networked equipment.

SUMMARY OF INVENTION

The following presents a simplified summary of the invention in order to provide a basic understanding of some aspects of the invention. This summary is not an extensive overview of the invention. It is intended neither to identify key or critical elements of the invention nor delineate the scope of the invention. Its sole purpose is to present some concepts of the invention in a simplified form as a prelude to the more detailed description that is presented later.

The present invention provides for a system and method for monitoring interference in a wireless communication system. The system and method monitor error statistic data at one or more devices (e.g., access points, mobile station systems) in a wireless communication system. The error statistic data can be utilized to determine the existence of the interference. If any unusual error statistic data are present at the one or more of the devices, raw unprocessed data is provided from the devices experiencing unusual (e.g., unusual amounts) error activity. The raw unprocessed data can be utilized to characterize the interference. For example, the raw unprocessed data can compared to one or more interference templates to determine an interference type (e.g., microwave oven, wireless phone, Bluetooth device). The raw unprocessed data can be compared between devices in the wireless communication system to determine the location of the interference.

In one aspect of the invention, the error statistic data is retrieved from one or more access points in a wireless communication system conforming to the IEEE 802.11b standard. If any unusual amounts of error statistic data are present at the one or more of the access points, raw unprocessed baseband data is provided from the access points experiencing unusual amounts of error activity. The raw unprocessed data can be utilized to characterize the interference by processing and comparing the data to stored interference or interference templates and/or comparing data taken from different access points in the system. The characterization information can be utilized to reconfigure the network to minimize the effects of the interference on the network. Additionally, the characterization information can be provided to a graphical user interface to display the locations of devices and interferers in the wireless network.

The following description and the annexed drawings set forth certain illustrative aspects of the invention. These aspects are indicative, however, of but a few of the various ways in which the principles of the invention may be employed. Other advantages and novel features of the invention will become apparent from the following detailed description of the invention when considered in conjunction with the drawings.

DETAILED DESCRIPTION OF THE INVENTION

The present invention relates to the monitoring of interference in a wireless communication system. An interference monitor is provided that monitors errors associated with interference in the wireless communication system. The interference monitor can then characterize the errors upon capturing data relating to the errors. The location and type of error can be reported to a network administrator or displayed on a graphical user interface with the other devices in the wireless communication system. Additionally, the characterization of the interference can be utilized to adapt or reconfigure the network to minimize the effect of the interference.

The interference monitor of the present invention operates automatically. The automated approach results in more expeditious resolution of interference problems. The present invention can continuously monitors a wireless LAN without disturbing its performance. The continuous monitoring can provide a long term log of interference activity which can help debug intermittent problems. The interference monitor can utilize radio receivers that are already in the wireless network to perform interference detection and location, thus eliminating the need for costly test equipment. The present invention can be used to monitor interferers in a given installation over time such that the network installation can be optimized, for example, by adding extra access points or repositioning existing access points. The solution can be enhanced to perform generalized location of mobile stations, including detection of network intruders.

Figure 1:
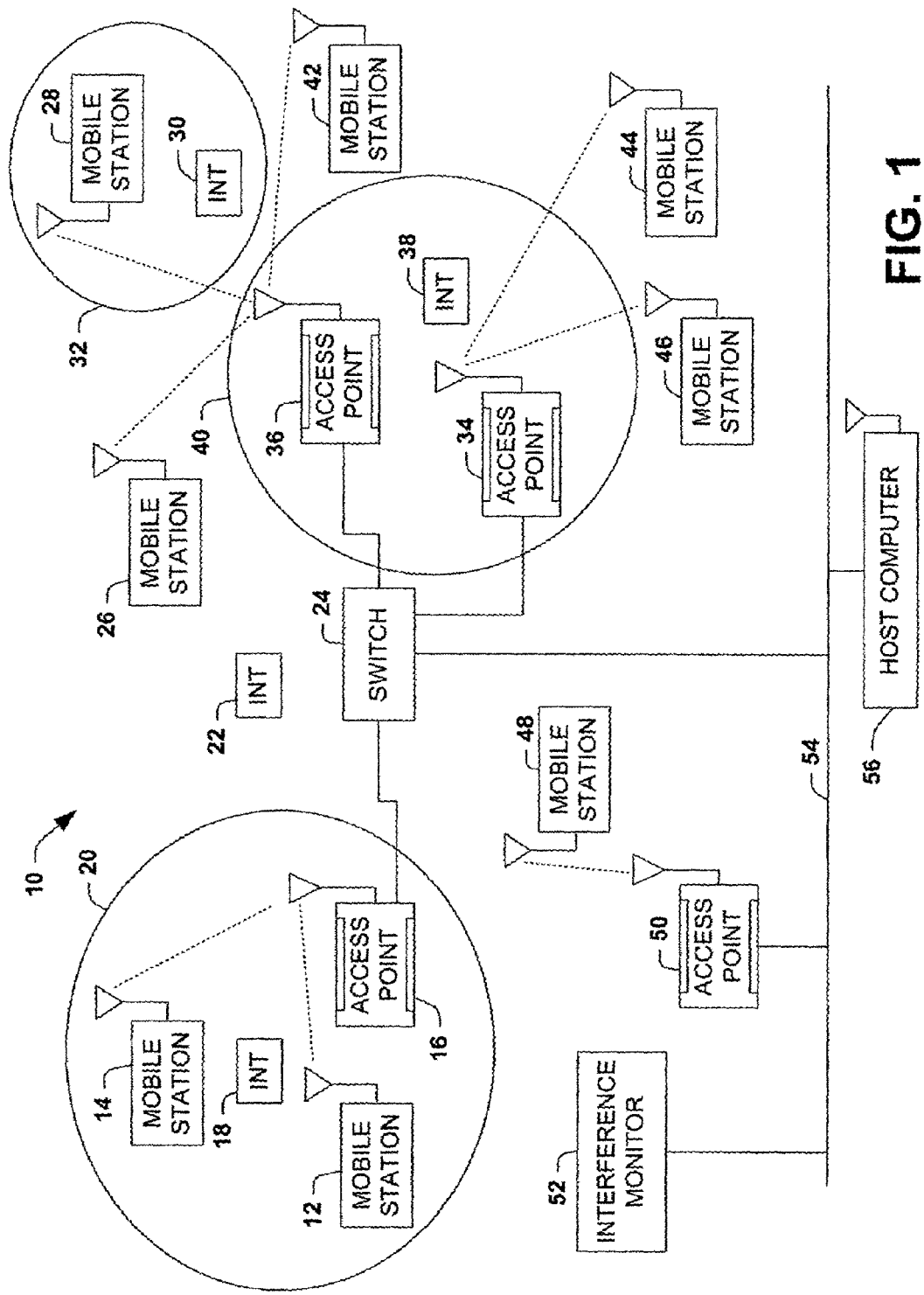
FIG. 1 illustrates a block diagram of a wireless communication system having an interference monitor in accordance with an aspect of the present invention.

Referring now to FIG. 1, a wireless communication system 10 employing the IEEE 802.11b standard is shown. In IEEE 802.11b wireless networking applications there are several common embodiments of wireless interface subsystems. Examples include PC Card, USB and mini PCI station interfaces as well as stand alone access points. The access point is a device that typically forms a bridge between a wired network and the mobile station systems. The wireless medium is shared between the stations in a manner defined by the 802.11b standard. The wireless communication system 10 includes a local area network (LAN) 54. The LAN or network backbone 54 can be a hardwired data communication path made of twisted pair cable, shielded coaxial cable or fiber optic cable, for example, or may be wireless or partially wireless in nature.

Coupled to the LAN 54 is an interference monitor 52 and several access points 16, 34, 36 and 50. The interference monitor 52 is operative to detect and characterize interference associated with wireless communications between devices in the system 10. Only one access point 50 is shown hardwired directly to the network backbone 54. The other access points 16, 34 and 36 are connected to the network backbone 54 through a switch 24 (e.g., an Ethernet switch). The access points may be hardwired to the network or can be wirelessly coupled to the backbone 54 (not shown).

Each access point serves as an entrance point through which wireless communications can occur with the network backbone 54 and, thus the mobile stations and access points in the system 10. As is conventional, each station associates itself, typically by registration, with an access point coupled to the network backbone 54, whether hardwired or wireless, such that a link is formed between itself and other devices situated on the network backbone 54. Each access point is capable of wirelessly communicating with other devices in the communication system 10 via respective antennas. A geographic cell (not shown) associated with each access point defines a region of coverage in which successful wireless communication can occur. Depending on the type of antenna selected, output power and RF sensitivity of the respective access point, the geographic cell may take one of several different forms and sizes.

The wireless comniunication system 10 also includes one or more mobile station systems. The mobile station systems each include an antenna for wirelessly communicating with other devices. In the example of FIG. 1, a mobile station system 12 and a mobile station system 14 are wirelessly communicating with the access point 16. Additionally, a mobile station system 26, a mobile station system 28 and a mobile station system 42 are wireless communicating with the access point 36. A mobile station system 44 and a mobile station system 46 are wireless communicating with the access point 34, and a mobile station system 48 is wirelessly communication with the access point 50.

Each mobile station system communicates with devices on the network backbone 54 via a selected access point and/or with other mobile station systems, and/or directly with the host computer 56 if within cell range of the host computer 56. Upon roaming from one cell to another, the mobile station system can be configured to associate itself with a new access point or directly with the host computer 56 if within range. The system 10 conforms to the IEEE standard 802.11b specification and uses a portion of radio frequency spectrum in the 2.4 GHz band.

In the present example, a number of interferers provide disruption to one or more devices in the wireless system 10.

A first interferer 18 (e.g., a 2.4 GHz cordless phone) has an interference range 20, capable of disrupting operation of all stations associated with the access point 16. A second interferer 30 (e.g., a Bluetooth peripheral) has an interference range 32 capable of disrupting operation of the mobile station system 28. A third interferer 22 (e.g., a leaky microwave oven) has an interference range covering the entire system 10, which is capable of disrupting operation of all wireless devices in the system 10. A fourth interferer 38 (e.g., 2.4 GHz cordless phone) has an interference range 40 capable of disrupting operation of the access point 34 and the access point 36.

The interference monitor 52 is operative to detect interference and characterize the interference (e.g., type of interference, location of interference). The interference monitor 52 can also be operative to report the interference (e.g., to a network administrator) and/or reconfigure operating parameters of the network to mitigate the effects of the interference on the system 10. The interference monitor 52 can be centralized at one point on the network 54, built into one access point or mobile station system, or distributed throughout the network. The interference monitor can implement a series of functions and/or algorithms via hardware and/or software that detect that interference is occurring, characterize the interference by identifying the type of interference and, when possible, its location. The interference monitor 52 can also be adapted to reconfigure the network operating parameters to minimize the effects of the interference and report the interference condition, along with information regarding the type and/or location of the interference source to a network administrator.

In one aspect of the invention, the interference monitor requests and receives error statistic data stored at one or more access points in the system 10. It is to be appreciated that error statistic data can also be collected at one or more mobile station systems in addition or instead of the one or more access points. If the interference monitor 52 detects an unusual amount of error statistic data for one or more access points and/or one or more mobile station systems, the interference monitor requests raw baseband data samples from the one or more access points. Data can also be requested from the individual mobile station systems by configuring the mobile station systems to collect error statistic data and/or transmit raw baseband data samples upon request. The interference monitor 52 primarily communicates via the wired network 54 and, thus is immune to RF interference.

If the interference monitor 52 determines that an interferer may be present it makes an estimation of the region impacted by the interferer, based on the station/access point links that reported elevated error statistics. The interference monitor 52 then requests raw baseband data from the one or more access points. The one or more access points then enter a recording period where raw baseband data for its respective radio is logged and then transmitted back to the interference monitor 52. The output takes the form of analog to digital converter samples. The sample data can be obtained with minimal disruption to the network by having the access point use the Network allocation vector to force periods of inactivity on the network during which sample data can be captured.

Once the interference monitor 52 receives the samples from the one or more access points, the interference monitor 52 can characterize the data. The sample data from the one or more access points is processed by the interference monitor 52. For example, the processing can involve comparing the frequency and time domain data to known interference templates with the objective of identifying the nature (e.g., type, location) of the interference. Additionally, the interference monitor 52 can compare data from the one or more access points to determine if the interference can be detected by more than one access point. If the interference can be detected by more than one access point, then the interference monitor 52 can provide an improved estimate of the location of the source of the interference.

For example, if the interference can be detected by three access points then the location of the interferer can be estimated in two dimensions, either by signal strength or time domain techniques, assuming that the location of the access points is fixed and known, either by user configuration or by a self detection algorithm. Once the interference monitor 52 has characterized the interferer it can record characterization results, a time stamp relating to the interference, and alert the network administrator. If sufficient information is available to allow the location of the interference to be determined, then the location information can be presented to the network administrator, for example, as an overlay on a map of the network office partitions to assist the administrator in rapid location of the interference.

The network administrator can configure the interference monitor 52 to enter an optional adapting state in which the interference monitor configures network operating parameters to mitigate or minimize the effect of the interferer. For example if the interference source is determined to be a microwave oven, the interference monitor 52 can command the affected access points to change operating parameters, such as maximum fragment size, so that the network can co-exist with the source of interference. If the source of the interference is in a narrow frequency band, then the interference monitor 52 can re-allocate the 802.11 channels to operate around the source of the interference. The interference monitor 52 continues to monitor the performance of the network and, if the source of the interference is removed, the interference monitor 52 can return the network to its original configuration.

Figure 2:
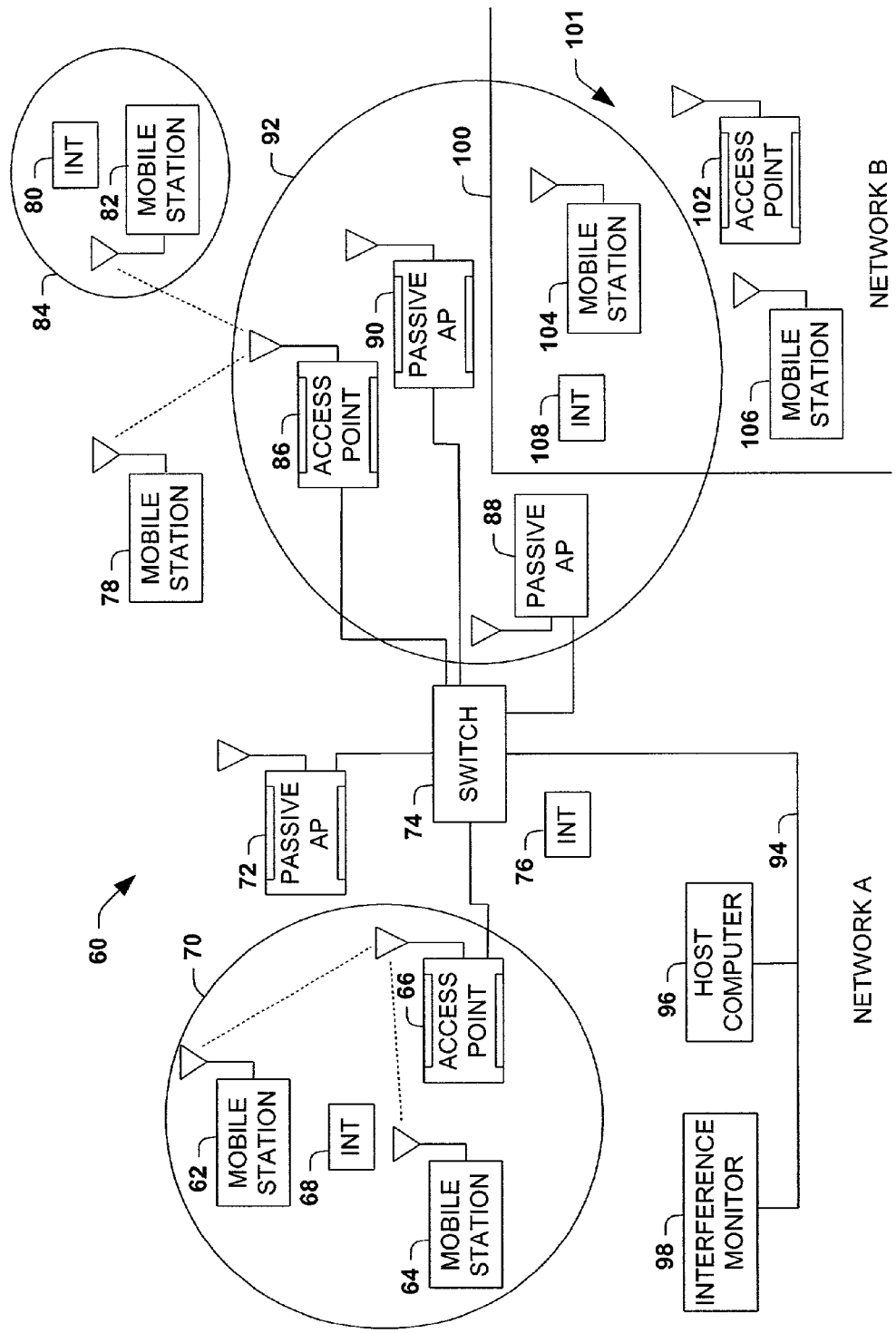
FIG. 2 illustrates a block diagram of a first wireless communication system having an interference monitor residing next to a second wireless communication system in accordance with an aspect of the present invention.

It is to be appreciated that the present invention is also applicable to locating interferers outside of a wireless communication system, for example, from another wireless communication system. FIG. 2 illustrates a first wireless communication system 60 employing the IEEE 802.11b standard. The first wireless communication system 60 is labeled as network A. A wireless communication system 101 resides behind a wall or building 100 and is labeled as network B. The second wireless communication system 101 includes a single access point 102 and mobile stations 104 and 106. The second wireless communication system 101 is coupled to a separate network backbone (not shown) from the first wireless communication system 60. The second wireless communication system 101 includes an interferer 108 that provides a source of interference to the first wireless communication system 60.

The wireless communication system 60 includes a local area network (LAN) 94. The LAN or network backbone 94 can be a hardwired data communication path made of twisted pair cable, shielded coaxial cable or fiber optic cable, for example, or may be wireless or partially wireless in nature. Coupled to the LAN 94 are an interference monitor 98 and a host computer 96. Also coupled to the LAN 94 are an access point 66 and an access point 86 through a switch 74 (e.g., Ethernet switch). The interference monitor 98 is operative to detect and characterize interference associated with wireless communications between devices in the system 60.

The wireless communication system 60 has been enhanced with the addition of passive access points 72, 88 and 90 coupled to the network 94 through the switch 74. The passive access points 72, 88 and 90 are operative to listen to network activity, but do not transmit. The passive access points 72, 88 and 90 can be used to provide additional information for improved location of interferers and stations in the network. The passive access points 72, 88 and 90 can also capture network activity without compromising network operation. In this way, the precision of automated network monitoring can be improved. In the event of interference with, or failure of, a regular active access point (66, 88), the passive access points (72, 88, 90) can be switched into an active mode as replacements.

The wireless communication system 60 also includes one or more mobile station systems. The mobile station systems each include an antenna for wirelessly communicating with other devices. In the example of FIG. 2, a mobile station system 62 and a mobile station system 64 are wireless communicating with the access point 66. Additionally, a mobile station system 78 and a mobile station 82 are wireless communicating with the access point 86. Each mobile station system communicates with devices on the network backbone 94 via a selected access point and/or with other mobile station systems.

In the present example, a number of interferers provide disruption to one or more devices in the wireless system 60. A first interferer 68 (e.g., a 2.4 GHz cordless phone) has an interference range 70, capable of disrupting operation of all stations associated with the access point 66. A second interferer 80 (e.g., a Bluetooth peripheral) has an interference range 84 capable of disrupting operation of the mobile station system 82. A third interferer 76 (e.g., a leaky microwave oven) has an interference range covering the entire system 60, which is capable of disrupting operation of all wireless devices in the system 60. A fourth interferer 108 (e.g., 2.4 GHz cordless phone) resides in the second wireless communication system 101 and has an interference range 92 capable of disrupting operation of the mobile station 104 in the second wireless communication system 101 and the access point 86 and the passive access point 88 and 90 in the first wireless communication system 60.

The interference monitor 98 is operative to detect interference and characterize the interference (e.g., type of interference, location of interference). The interference monitor 98 can also be operative to report the interference (e.g., to a network administrator) and/or reconfigure operating parameters of the network to mitigate the effects of the interference on the system 60. The interference monitor 98 can implement a series of functions and/or algorithms via hardware and/or software that detect that interference is occurring, characterize the interference by identifying the type of interference and, when possible, its location. For example, in the example of FIG. 2, the interference monitor 98 can be adapted to determine that the location of the interferer 108 is in the building 100 outside the first wireless communication system 60. This information can be provided to a network administrator, which can then inform the network administrator of the second wireless communication about the interferer 108, so that corrective action can be taken. The passive access points 72, 88 and 90 can be commanded by the interference monitor 98 to participate in quiescent, capture and characterization states. The interference monitor 98 can also redesignate access points within the network as "Passive" or "Active".

Figure 3:
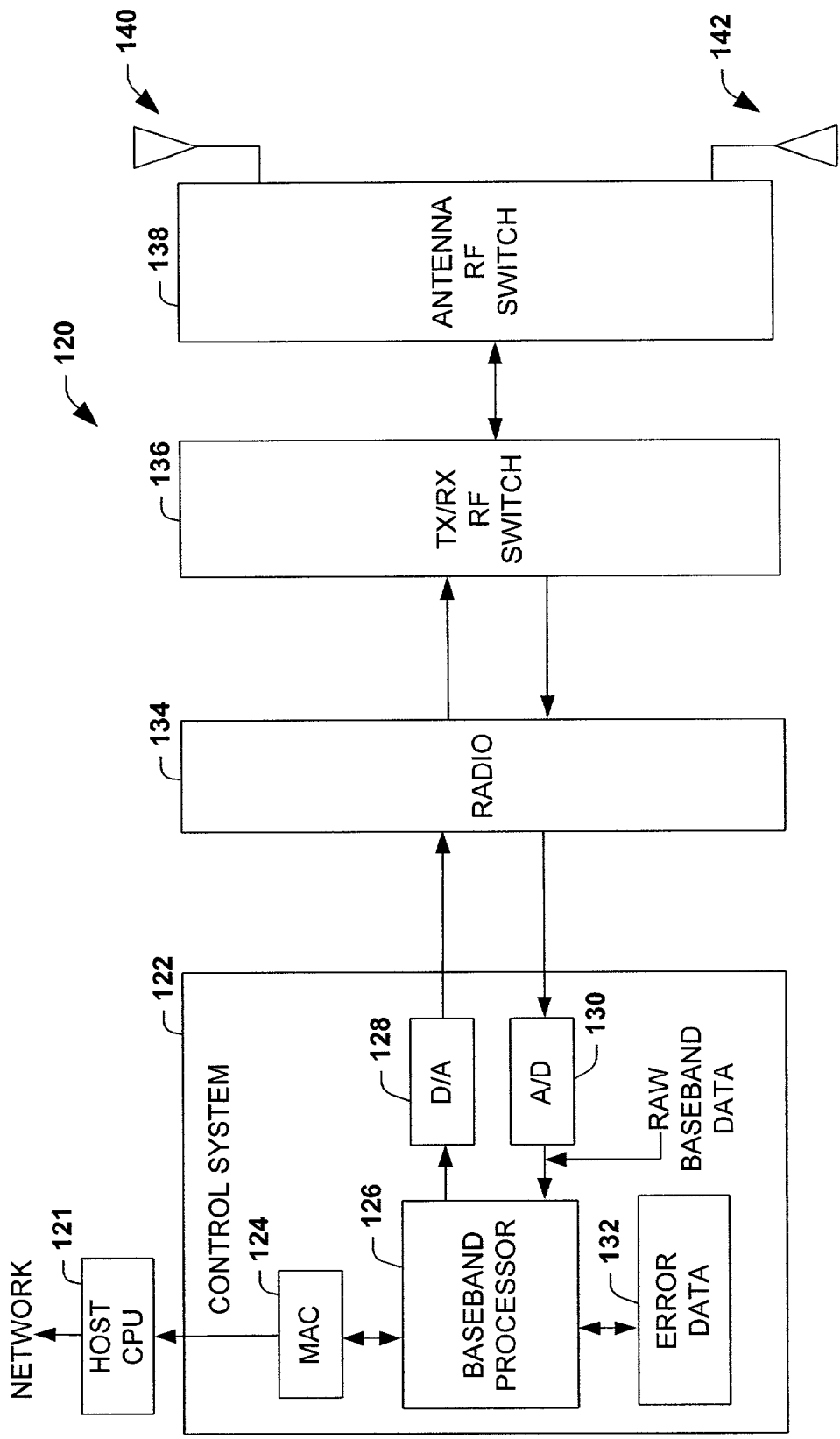
FIG. 3 illustrates a schematic block diagram of an access point in accordance with an aspect of the present invention.

FIG. 3 illustrates a block schematic diagram of an access point 120 for a wireless communication system in accordance with an aspect of the present invention. The access point 120 includes a control system 122 that provides communications between a host central processor unit 121 (CPU) coupled to a network, the interference monitor and the mobile station systems. The control system 122 includes a MAC layer 124 that provides the appropriate protocol (e.g., Ethernet frames) across the network backbone and receives and transmits wireless communications between the host processor and the mobile stations through a baseband processor 126. The baseband processor 126 receives communications from the host processor via the MAC layer 124 and transfers the communications to a radio component 134 through a digital-to-analog converter (D/A) 128. The radio component 134 is coupled to a transmit and receive radio frequency (TX/RX RF) switch 136 which selects between transmitting and receiving communications.

The TX/RX RF switch is coupled to an antenna RF switch 138. The antenna RF switch selects between one or more antennas for capturing communications and interference. The access point 120 includes a first antenna 140 and a second antenna 142 coupled to the antenna RF switch 138. It is to be appreciated that the interference detection and characterization can be further improved by use of directional or active antennas in the access point 120 which provides more effective location of the interference sources. The antenna 140 and the antenna 142 can include or be multiple directional or phased array antennas to improve in the assistance of locating interferers.

The access point 120 receives communications and any interference through the antenna 140 and/or the antenna 142, which is transferred through the antenna RF switch 138, the TX/RX RF switch 136 and the radio component 134 to the control system 122. The control system 122 includes an analog-to-digital converter (A/D) 130 that converts the received analog baseband data into raw digital baseband data. The raw digital baseband data is processed by the baseband processor 126. Transmission errors that occur are logged in an error data file 132. The control system 122 is adapted to periodically transmit error data to an interference monitor. Alternatively, the control system 122 can be adapted to periodically transmit error data back to the interference monitor upon request from the interference monitor. The error data is utilized by the interference monitor to determine whether or not interference is occurring within the range of the access point 120.

The control system 122 is also adapted to provide raw baseband data to the interference monitor upon request so that the interference monitor can process the raw baseband data and characterize the interference. The access point 122 can also be switched between an "active" mode and a "passive mode" by the interference monitor. Any of the commands to change the functional operation of the access point can be provided by the host processor instead of the interference monitor. It is also to be appreciated that the functionality of the interference monitor can be embedded in the control system 122 of the access point 120, so that the interference detection and characterization can be performed within the access point 120. The network adaptations and/or corrections can then be performed by the access point 120 itself. Alternatively, the characterization information can be provided to a central interference monitor or the host computer which provides the appropriate adaptation and/or corrections.

Figure 4:
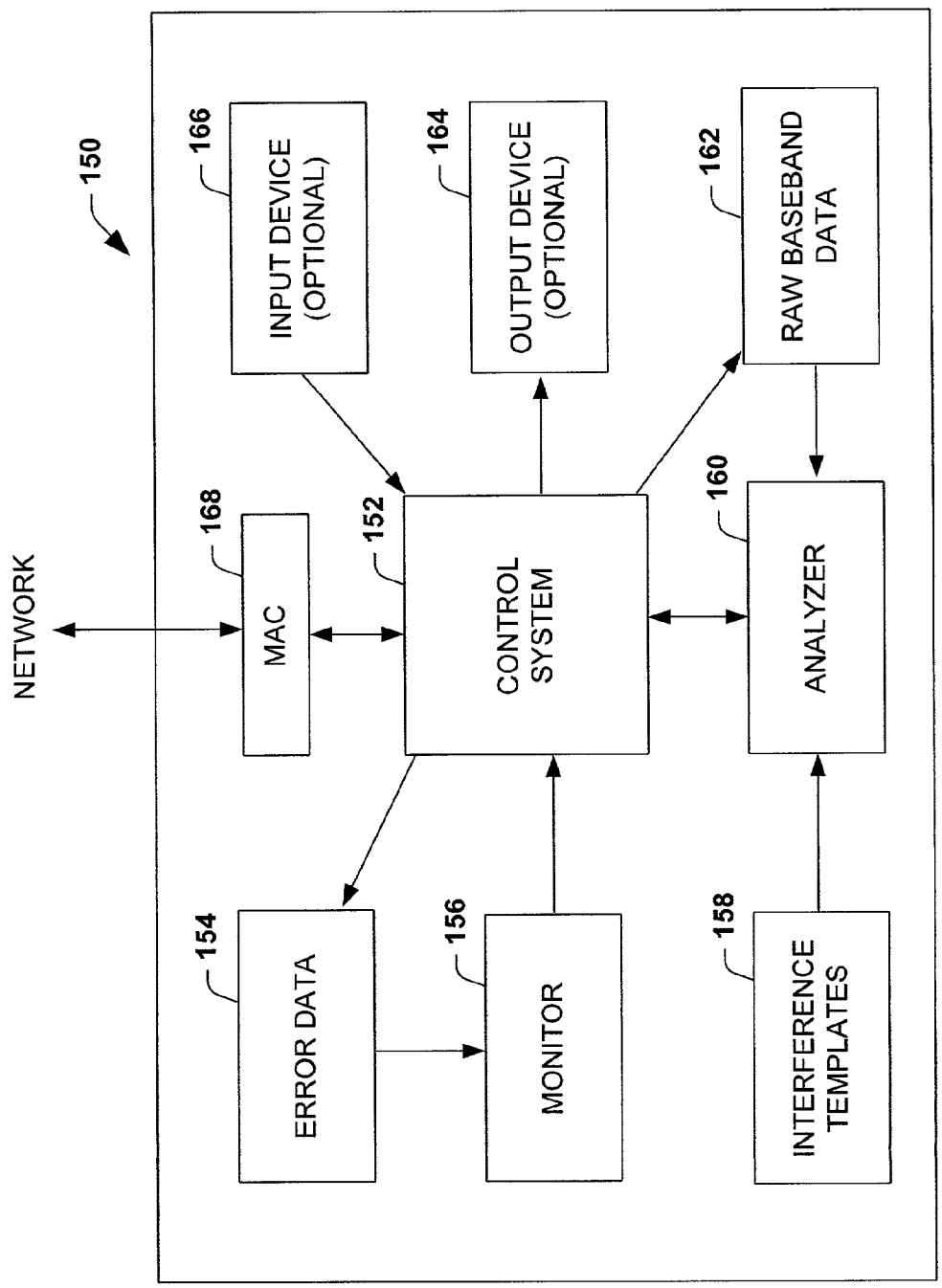
FIG. 4 illustrates a functional block diagram of an access point in accordance with an aspect of the present invention.

FIG. 4 illustrates a functional block diagram of an interference monitor 150 in accordance with an aspect of the present invention. The interference monitor 150 includes a control system 152 that provides communications over the network between the host central processor unit (CPU), the access points and the mobile station systems. The control system 152 communicates over the network using a MAC layer 168 that provides the appropriate protocol (e.g., Ethernet frames) across the network backbone. The interference monitor 150 is operative to detect interference and characterize the interference (e.g., type of interference, location of interference) that occurs over a wireless network. The interference monitor 150 can also be operative to report the interference (e.g., to a network administrator) and/or reconfigure operating parameters of the network to mitigate or minimize the effects of the interference on the wireless communication system.

The central control system 152 receives or requests and receives statistical error data from one or more access points and/or mobile stations systems of the network in which the interference monitor is coupled. The statistical data is logged to one or more error data files 154. A monitor 156 evaluates the error patterns to determine if any elevated error statistics are occurring, which is an indication that an interferer may be present. If the monitor 156 determines that an interferer may be present it provides an indication or interrupt signal to the control system 152. The control system 152 or the monitor 156 makes an estimation of the region impacted by the interferer, based on the station/access point links that reported elevated error statistics. The control system 152 then requests raw baseband data from the one or more access points and/or mobile station systems. Additionally, the control system 152 can request additional capture data over different time periods or different channel frequencies. Methods which are more disruptive to network operation may be used to gather data over longer periods, for example, by forcing mobile station systems to disassociate from an access point.

The control system 152 receives the sampled data and then stores the sampled data in one or more raw baseband data files 162. Once the samples from the one or more access points are received, an analyzer 160 can process and characterize the data by comparing the data to one or more interference templates 158 stored at the interference monitor 158 or accessible over the network. The one or more interference templates 158 can contain frequency and time domain data corresponding to specific interferers (e.g., microwave ovens, Bluetooth device, 2.4 GHZ phone) to characterize the interference utilizing known interference templates with the objective of identifying the nature (e.g., type, location) of the interference. Additionally, the analyzer 160 can compare data from the one or more access points to determine if the interference can be detected by more than one access point. If the interference can be detected by more than one access point, then the analyzer can provide an improved estimate of the location of the source of the interference.

Once the analyzer has characterized the interferer it can provide this information to the control system 152. The control system 152 can provide these characterization results, a time stamp relating to the interference, and an alert to the network administrator through the host computer or some other mechanism. For example, a web browser that communicates with a web server residing in the interference monitor 150. The control system 152 or a host computer can provide an overlay on a map of the mobile station systems and interferers for the network in a graphical user interface (GUI) to assist the administrator in rapid location of the interference. The control system 152, the host computer or the network administrator can reconfigure the network operating parameters to mitigate or minimize the effect of the interferer.

Figure 5:
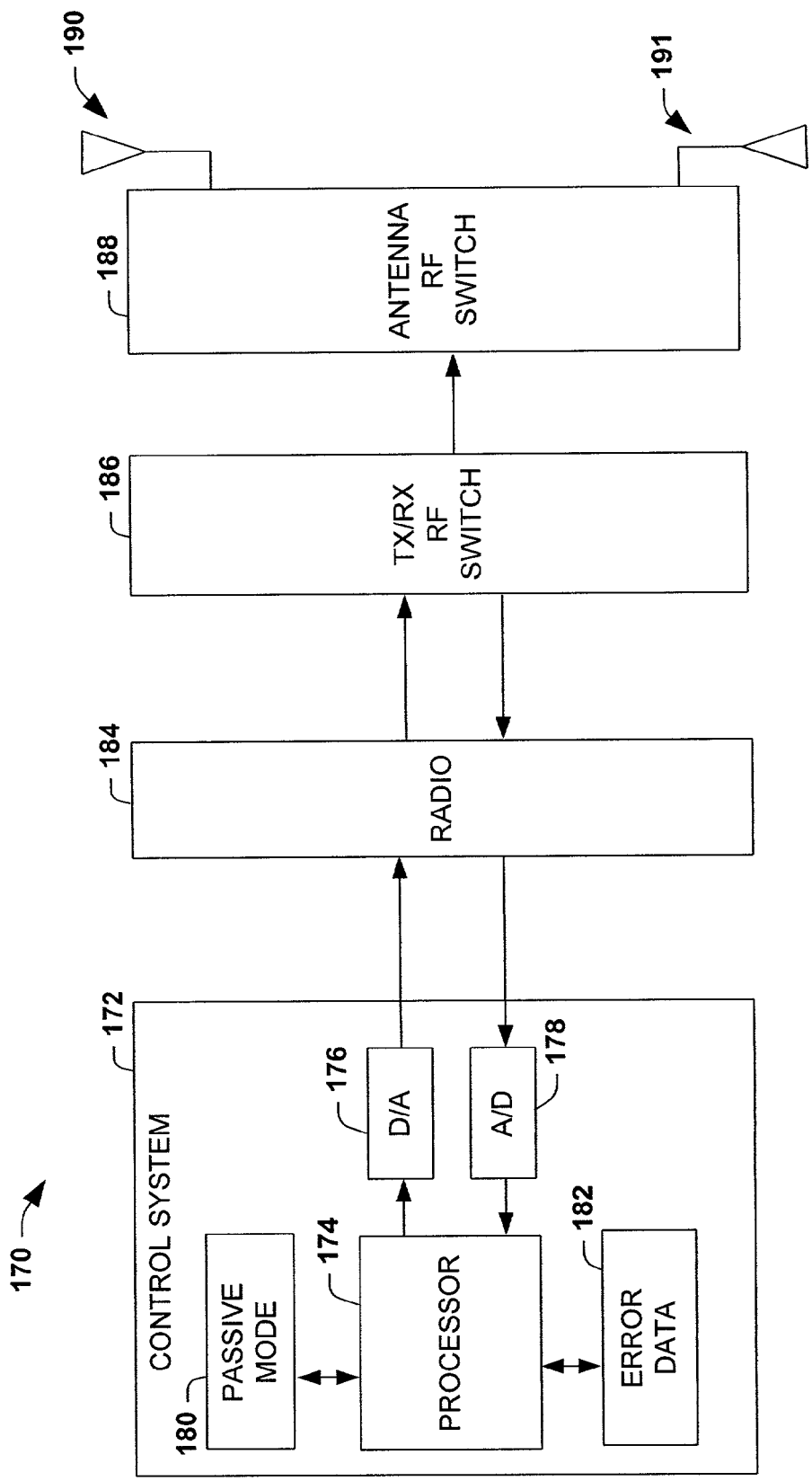
FIG. 5 illustrates a schematic block diagram of a mobile station system in accordance with an aspect of the present invention.

FIG. 5 illustrates a block schematic diagram of a mobile station system 170 for a wireless communication system in accordance with an aspect of the present invention. The mobile station system 170 includes a control system 172 that provides communications between a host central processor unit (CPU) and an interference monitor through an access point. The control system 172 includes a processor 174 that facilitates communications to and from the mobile station system 170. The processor transmits communications to a radio component 184 through a digital-to-analog converter (D/A) 176. The radio component 184 is coupled to a transmit and receive radio frequency (TX/RX RF) switch 186 which selects between transmitting and receiving communications. The TX/RX RF switch 186 is coupled to an antenna RF switch 188. The antenna RF switch 188 selects between one or more antennas for capturing communications between a network (not shown) and interference within the wireless communication system.

The mobile station system 170 receives communications and any interference through an antenna 190 and an antenna 191, which is transferred through the antenna RF switch 188, the TX/RX RF switch 186 and the radio component 184 to the control system 172. It is to be appreciated that the interference detection and characterization can be further improved by use of directional or active antennas in the mobile station system 170, which provides more effective location of the interference sources. The antenna 190 and the antenna 191 can include or be multiple directional or phased array antennas to improve in the assistance of locating interferers. The control system includes an analog-to-digital converter (A/D) 178 that converts the received analog baseband data into raw digital baseband data. The raw digital baseband data is processed by the processor 174.

In one aspect of the invention, the mobile station system 170 can track error data in an error data file 182 in a log error data mode. Additionally, the mobile station system 170 can execute a passive or sleep mode algorithm 180 in a passive mode. The error data can be transmitted to an interference monitor through an access point. The processor 174 can be adapted to enter a passive silent state for an arbitrary period of time to allow the access point to gather sample data. Additionally, the processor 174 can be programmed to gather sample data automatically in periods when network errors are detected and later forward that data to the access point. The data gathered from the mobile station system 170 can be used by the interference monitor to characterize the interferer. If the location of the mobile station system 170 is known, for example, by employing some other scheme such as a global positioning satellite (GPS) device, or can be estimated by the interference monitor, then the sample data from the mobile station system 170 can also be used in calculating the estimated location of the interferer.

Figure 6:
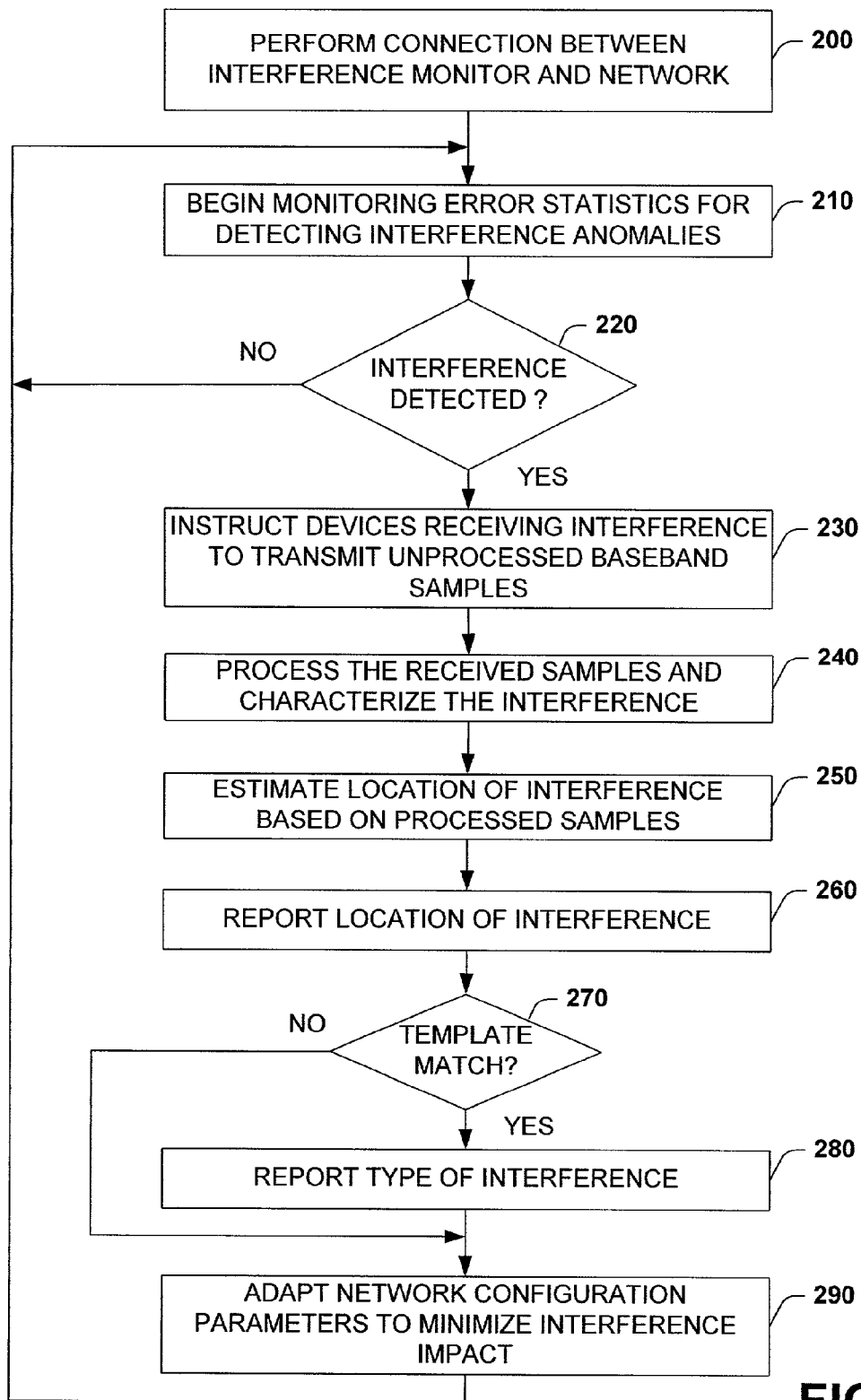
FIG. 6 illustrates a flow diagram of a methodology for monitoring interference in a wireless communication system in accordance with an aspect of the present invention.

In view of the foregoing structural and functional features described above, a methodology in accordance with various aspects of the present invention will be better appreciated with reference to FIG. 6. While, for purposes of simplicity of explanation, the methodology of FIG. 6 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention.

FIG. 6 illustrates one particular methodology for monitoring interference on a wireless communication network. The methodology begins at 200. At 200, a connection between an interference monitor and a network is performed. The interference monitor can be a separate stand-alone device, implemented in a host computer or implemented in an access point or a mobile station system. At 210, monitoring of error statistics begins for detecting interference anomalies in one or more access points and/or mobile stations. At 220, the methodology determines whether or not any interference has been detected. If interference is not detected (NO), the methodology returns to 210 to continue monitoring error statistics. If interference is detected (YES) at 220, the methodology proceeds to 230.

At 230, the devices receiving interference are instructed to transmit unprocessed raw data samples (e.g., baseband) to the interference monitor. At 240, the unprocessed data samples are received by the interference monitor, processed and the interference characterized based on the processing. At 250, the location of the interference is estimated based on the processed samples. For example, the error activity may be increased at one or more access points indicating the general presence of the interferer. Furthermore, signal strength (e.g., amplitude of signal received by access point(s)) and time domain techniques (e.g., time to get to access point(s)) can be used to increase the reliability of the location of the interferer. At 260, the location of the interference can be reported to the network administrator, for example, via the host computer.

The methodology then proceeds to 270 where the processed samples are compared to one or more interference templates corresponding to one or more interference types, respectively. If the processed samples do not match any of the stored templates (NO) at 270, the methodology advances to 290. If the processed samples do match one of the templates (YES), the type of interference is reported to the network administrator, for example, via the host computer. It is to be appreciated that the reporting of the location of the interference at 260 and the type of interference at 280 can be provided concurrently. For example, the type and location of the interference can be displayed in a GUI interface at the host computer. At 290, the network configuration parameters are adapted to minimize the impact of the interference.

For example, if a microwave oven is the interferer, the method can employ passive access points to capture digitized radio output over an extended period of the order of a second, without degrading network performance. The captured samples can be matched to templates of microwave interference using characteristics of spectral width and 60 Hz modulation. The samples captured from the active access points can be compared in amplitude to estimate the location of the microwave oven. The results are then presented on a map to the network administrator. The maximum fragment size parameters of the impacted access point can be configured to minimize the impact of the microwave oven. When the microwave oven ceases to be a source of interference, the configuration of the access point is returned to its initial state.

If a 2.4 GHz cordless phone is the interferer, then increased errors traffic is determined near the effected devices. Captured sample data can be compared to known templates for 2.4 GHz phones to identify the source if the interference. The location of the 2.4 GHz cordless phone can be determined from the effected devices. For example, the more access points that can detect the 2.4 GHz cordless phone then the estimated area of location will be more precise. If a Bluetooth device is the interferer, the captured baseband data at relatively few devices can be used to characterize the interferer as a Bluetooth device. Since the Bluetooth device is a low power device, it may not be detected beyond more than a few devices, so location estimation will be restricted to a smaller area and be less precise. This area may be narrowed if the mobile station systems are enhanced to support baseband capture and reporting. The method then returns to 210 to continue monitoring for interference.

Figure 7:
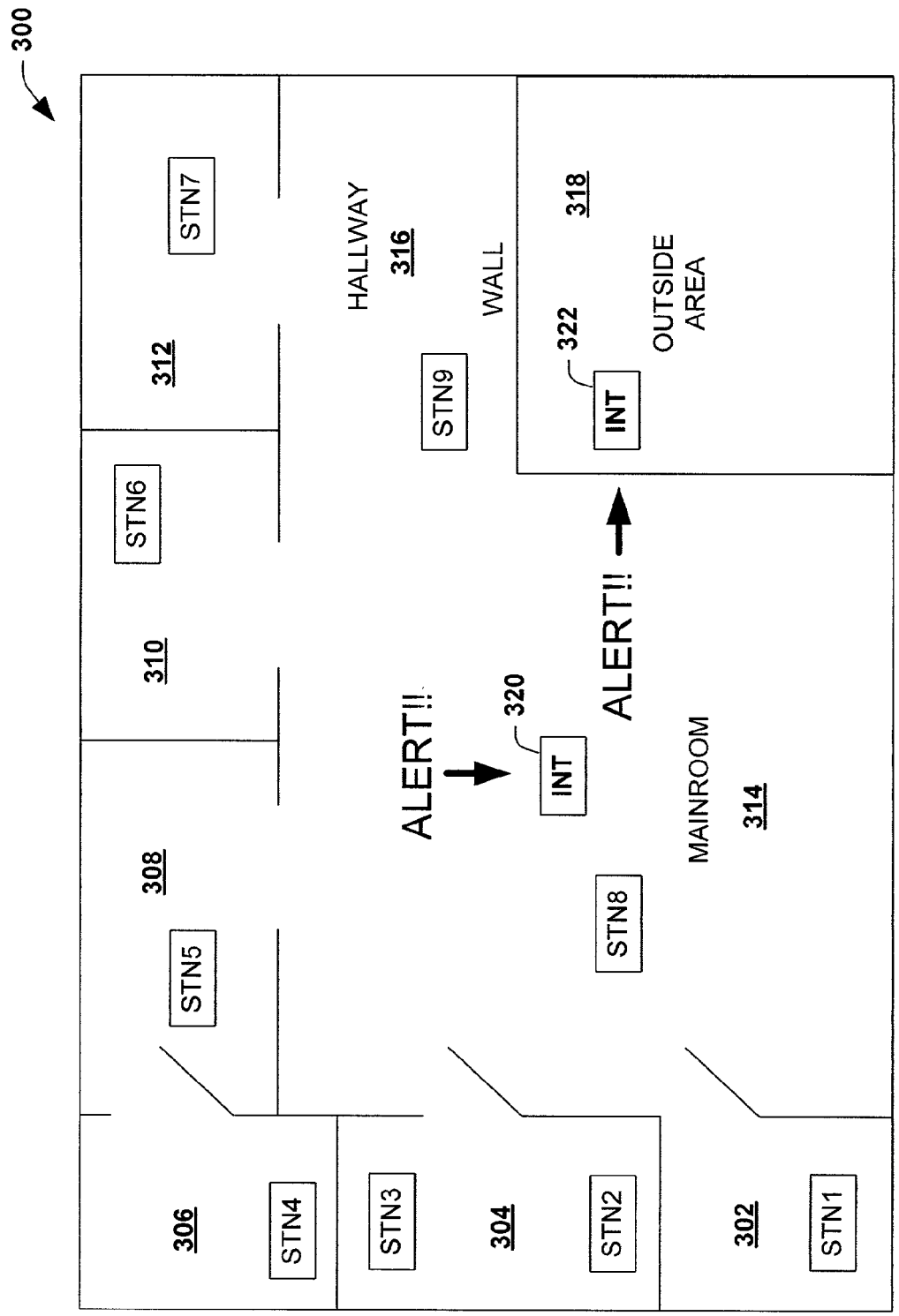
FIG. 7 illustrates a graphical user interface for displaying interferers in a wireless communication system in accordance with an aspect of the present invention.

FIG. 7 illustrates an example of a GUI interface 300 that can be provided to a host computer or some other computer coupled to the network. The GUI interface 300 displays an office area having a main room, six offices, a hallway and an outside area. A first mobile station STN1 is displayed as residing in a first office 302. A second mobile station STN2 and a third mobile station STN3 is displayed as residing in a second office 304. A fourth mobile station STN4 is displayed as residing in a third office 306, a fifth mobile station STN5 is displayed as residing in a fourth office 308, a sixth mobile station STN6 is displayed as residing in a fifth office 310 and a sixth mobile station STN7 is displayed as residing in a sixth office 312. An eighth mobile station STN8 is displayed as residing in a mainroom 314 an a ninth mobile station STN9 in a hallway 316. A first interferer 320 has been detected in the central region of the main room 314. An "ALERT" warning is provided identifying the location of the first interferer 320. A second interferer 322 has been detected in an outside area 318. An "ALERT" warning is provided identifying the location of the second interferer 322. The network administrator can then personally go to these areas to locate and remove the interferers. Additionally, adaptive and/or corrective actions can be taken and the GUI display 300 utilized to determine if the adaptive or corrective actions corrected for the interference.

The examples provided in the drawings illustrate a separate interference monitor. However, it is to be appreciated that the functionality of the interference monitor can be implemented across one or more devices in the network. For example, a portion of the interference monitor can reside in an access point, the host computer or a mobile station. A controller or monitor can send a command to the devices to collect and process the data locally within the device. The processed data can be sent to the controller or monitor for matching to an interference template, such that less traffic is generated on the wired network. Furthermore, interference template matching can occur within the device, and the interference characterization transmitted back to the controller or monitor.

What has been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A wireless communication system comprising:
 a plurality of access points coupled to a network;
 a plurality of mobile station systems operative to communicate wirelessly to at least one of the plurality of access points; and an interference monitor configured to monitor interference in the system by monitoring error statistic data from the at least one of the plurality of access points, the interference monitor is further configured to request baseband data from the at least one of the plurality of access points upon detecting unusual error statistic data.

2. The system of claim 1, the interference monitor operative to determine the location of the interference utilizing the raw baseband data.

3. The system of claim 1, the interference monitor operative to determine the type of interference by comparing the raw baseband data to at least one interference template.

4. The system of claim 1, the interference monitor operative to determine the location of the interference and the type of interference utilizing the raw baseband data and transmit the location of the interference and the type of interference to a graphical user interface, the graphical user interface displaying the location of the plurality of mobile station systems and the type and location of interference.

5. The system of claim 1, the interference monitor operative to determine the location of the interference utilizing the error statistic data.

6. The system of claim 1, at least one of the plurality of mobile station systems being adapted to log error data and transmit the error data to the interference monitor for analysis.

7. The system of claim 1, at least one of the plurality of mobile station systems being adapted to enter a passive mode, while at least one of the plurality of access points is gathering sample data for determining the existence of interference.

8. The system of claim 1, the interference monitor operative to reconfigure the network to minimize the effects of any detected interference.

9. The system of claim 1, the interference monitor operative to transmit interference information to a host computer, the host computer utilizing the interference information to reconfigure the wired communication system to minimize the effects of any detected interference.

10. The system of claim 1, at least one of the plurality of access points comprising at least one passive access point that monitors interference.

11. The system of claim 1, the plurality of access points being switchable between an active mode and a passive mode.

12. The system of claim 1, at least one of the plurality of access points utilizing at least one of a directional antenna and an active antenna.

13. The system of claim 1, wherein the interference monitor being incorporated into at least one of an access point, a host computer and a mobile station system.

14. The system of claim 1, the interference monitor being a stand-alone device coupled to the network.

15. The system of claim 1, the wireless communication system conforming to the IEEE 802.11b standard.

16. The system of claim 1, the interference monitor operative to determine if interference is present outside the wireless conimunication system.

17. An interference monitor for monitoring interference within a wireless communication system, the interference monitor comprising:
a control system operative to retrieve error statistic data from at least one device in the wireless communication system;
a monitor that monitors the error statistic data and informs the control system if unusual error statistic data is present at the at least one device, the control system retrieving raw data from the at least one device that unusual error statistic data has been detected; and
an analyzer that utilizes the raw data to characterize interference present in the wireless communication system.

18. The monitor of claim 17, the analyzer characterizes the interference by processing the raw data and comparing the processed raw data to at least one interference template to determine the type of interference.

19. The interference monitor of claim 17, the analyzer characterizes the interference by comparing raw baseband data from one or more access points to determine the location of the interference.

20. The interference monitor of claim 17, the control system transmits the characterization information to a graphical user interface, the graphical user interface displaying at least a portion of the wireless communication system and at least one of a type and a location of the interference.

21. The interference monitor of claim 17, one of the analyzer, the monitor and the control system operative to determine the location of the interference.

22. The interference monitor of claim 17, the control system operative to reconfigure the wired communication system to minimize the effects of any detected interference.

23. The interference monitor of claim 17, the control system operative to transmit interference information to a host computer, the host computer utilizing the interference information to reconfigure the wired network to minimize the effects of any detected interference.

24. The interference monitor of claim 17, the control system operative to switch access points between an active mode and a passive mode to minimize the effects of any detected interference.

25. The interference monitor of claim 17, at least a portion of the interference monitor being incorporated into at least one of an access point, a host computer and a mobile station system.

26. The interference monitor of claim 17 being a stand-alone device coupleable to a wired network.

27. The interference monitor of claim 17 characterizes interference by utilizing at least one of signal strength, frequency domain techniques and time domain techniques.

28. A method for detecting interference in a wireless communication system, the method comprising:
monitoring error statistics from at least one device in a wireless communication system;
determining if unusual error statistic data is present at the at least one device;
requesting unprocessed data samples from the at least one device in which unusual error statistic data is present; and
characterizing interference within the wireless communication system utilizing the unprocessed data samples.

29. The method of claim 28, the characterizing interference comprising determining the type of interference by processing the unprocessed data samples and comparing the processed data samples to at least one interference template.

30. The method of claim 28, the characterizing interference comprising determining the location of the interference.

31. The method of claim 28, further comprising reconfiguring the wireless communication system to minimize the effects of any detected interference.

32. The method of claim 28, further comprising displaying at least a portion of the wireless communication system and the type and location of interference in a graphical user interface.

33. The method of claim 28, further comprising switching at least one access point between a passive mode and an active mode to minimize the effects of any detected interference.

34. An interference monitor for detecting interference in a wireless communication system, the monitor comprising:

means for evaluating error statistics from at least one access point in a wireless communication system;

means for determining if unusual error statistic data is present at the at least one access point; and means for characterizing interference in the wireless communication system utilizing unprocessed data samples from the at least one access point in which unusual error statistic data is present.

35. The monitor of claim 34, further comprising means for reconfiguring the wireless communication system to minimize the effects of any detected interference.

\* \* \* \* \*